2,750,806
GEAR BOX UNIT

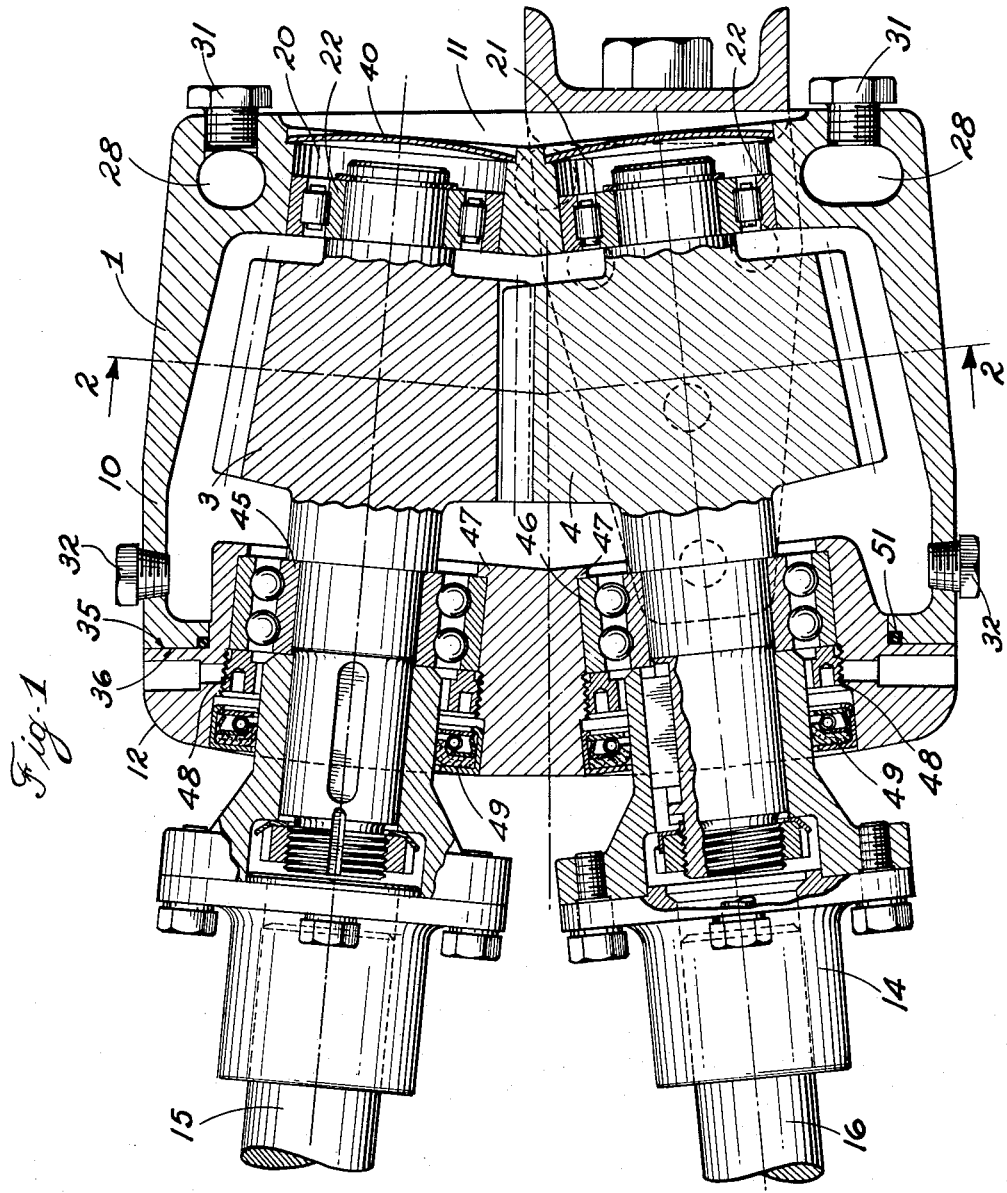

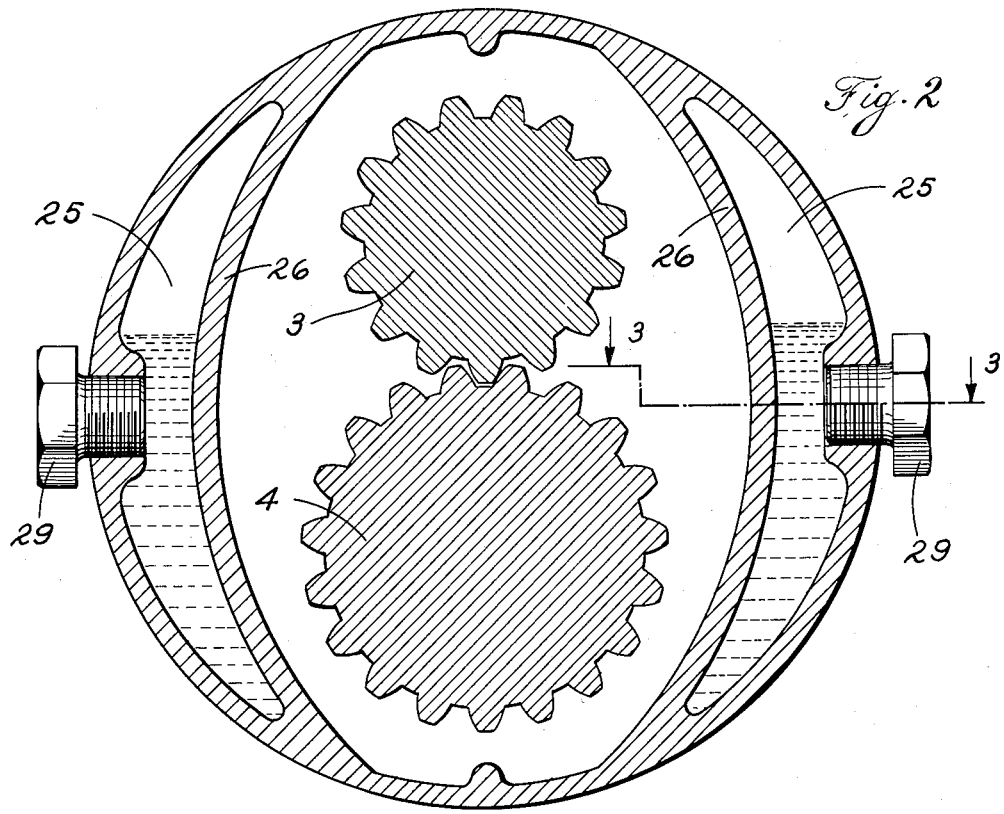
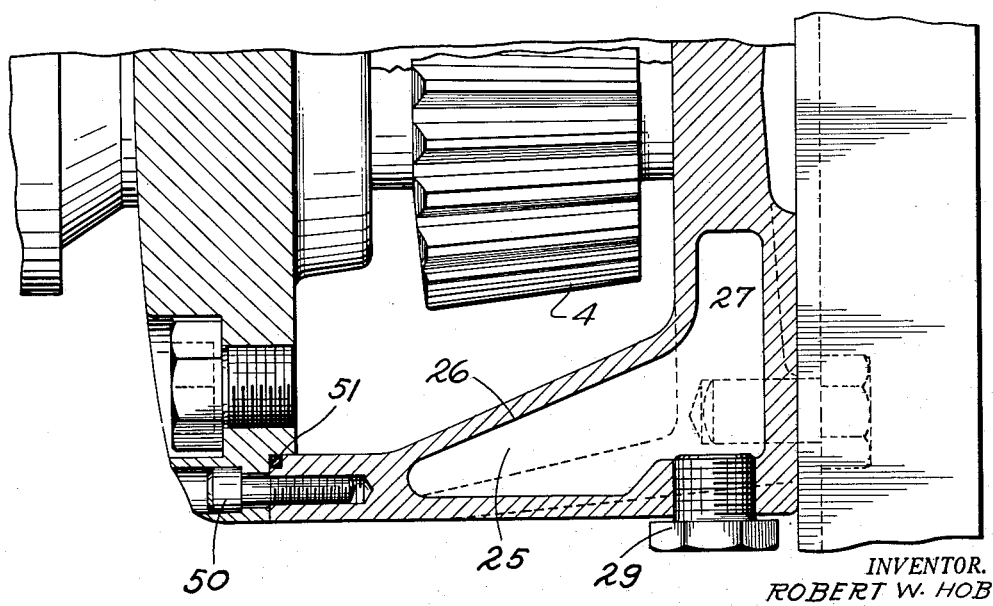

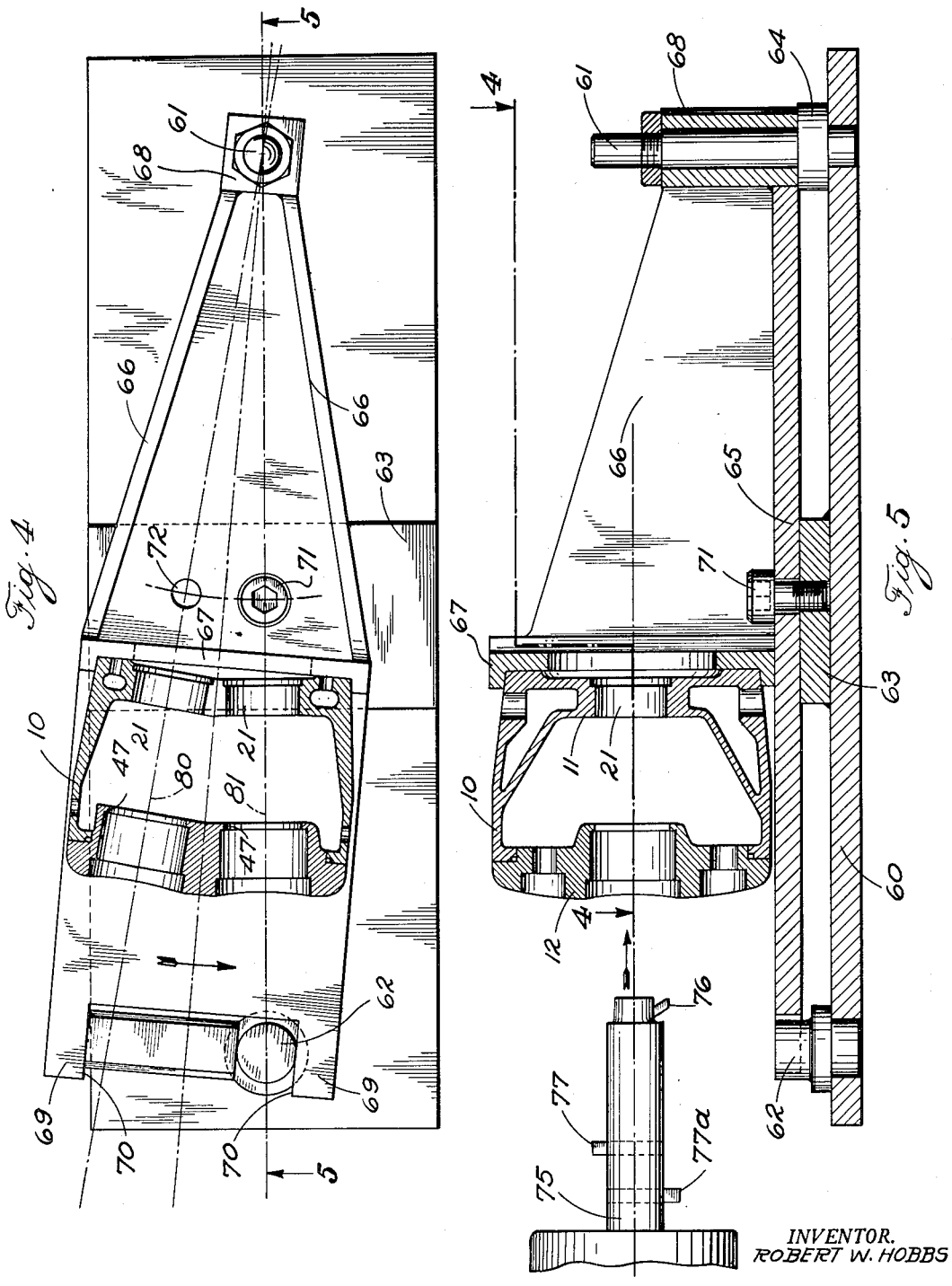

Robert W. Hobbs, Miami, Fla.

Application March 7, 1950, Serial No. 148,160

10 Claims. (Cl. 74—417)

This invention relates to the gearing art and is concerned with a new gear box unit and a new method of, and apparatus for, boring a gear case to receive angularly arranged beveled gears.

Although gear box units have long been known, there has never been any substantial change in the method of positioning the gears in the box which involved the use of shims and, as a result, gears are often noisy and of short life because of faulty alignment. The customary procedure was to machine the gears then assemble them in the case and operate them long enough to determine the tooth contact areas. Then the apparatus was disassembled and shims were put in to move the gears axially to bring the contact areas to the places desired. Frequently the parts had to be thus assembled, tested, disassembled, adjusted and reassembled a number of times before the gears were properly positioned in the case. Gears are often made so that they do not show proper contact areas unless they are run under a load and deflect. Therefore, merely assembling and bluing is not always sufficient to determine correct position. The gear maker would rather have the gears located by dimension than by contact areas. So far as I know, no one, heretofore, has ever devised a positive method or means by which the gear box of a V-drive could be machined to have a definite or measurable cone dimension so that the gears could be initially placed in their proper position in the case, thereby avoiding the expensive, prolonged and tedious "cut and try" previous method of positioning the gears.

Accordingly, one object of the present invention is to provide a method of, and means for, predetermining and obtaining initially the proper location of angular gears in a gear box unit.

The ideal results are realized by use of my combination of gear box design, the special jig and method of manufacture which attains results long sought in vain by gear makers. This invention affords a method and means of machining a gear box accurately as to cone distances and the place of centerlines intersection and the angles between the centerlines of the gears. It permits direct fundamental observations and measurements to be made before, during and after machining and before assembly.

While the foregoing invention is useful in connection with all bevel gear box units for different uses, it is particularly advantageous in connection with uses where high weight strength efficiencies are required such as aircraft and where quietness of operation is essential, such as marine, automotive, trucks and busses and many industrial applications. However, the desirability of gears in the above application is widely recognized but is not realized in conventional boxes because of excessive weight, noise and/or cost. Gear box units embodying the present invention make it practical to equip pleasure boats or boats of high speed with V-drives. V-drives have many advantages over direct drives, perhaps the most important of which is that they make it possible so to locate the engine in the boat that more comfortable and larger living space is afforded, with greater protection from fire and greater economy.

Gear box units as constructed heretofore have not been entirely satisfactory for several reasons including the high cost of machining the case and positioning the gears therein and the noise of the unit due to inaccurate machining and gear positioning. The units were expensive because the case had surfaces so located relative to each other as to prevent economy of production and to make the machining costs high and to make it difficult, if not impossible, to machine the various surfaces with a sufficiently high degree of accuracy to locate the important related parts, without the use of "cut and try" shims, where the gears would be quiet and efficient in operation. Accordingly, another object of this invention is to remove both of these objections and this object is attained by the provision of the extremely accurate and inexpensive method of manufacture of the gear box by the present invention.

It is frequently desirable to be able to reverse the speed ratios of the driving and driven shafts, for example, to drive a propeller shaft at the higher or lower speed. Usually this can be accomplished only by disassembling and reversing the gears which is a time-consuming operation. Accordingly, another object of the invention is to provide a gear box unit which can be inverted or turned through 180° with resultant reversal of the speed ratios between the two shafts without making any change in gears or modification of the case itself.

In conventional gear boxes wherein the case is jacketed for cooling the oil around the gears, two separate, cooling fluid jackets are usually provided, each equipped with upper and lower inlet and outlet pipes. These several pipes added to the cost of construction and maintenance and imposed obstacles to reversal of the gear box for changing gear ratios. Accordingly, a further object of this invention is to provide a case having jackets which are connected to each other near their ends and a passage opening into each jacket, either of which passages may be used to conduct fluid into or out of its jacket.

Another object is to provide a method of, and means for, machining a case for angular gears in which the shaft lines will intersect and will be the same angle as that used in the cutting of the gears, and in which the cone distance, i. e., the distance from the intersection of the shaft lines to a given point on the gears when assembled in the case, will be the same as that used in cutting the gears.

The present invention will be better understood by those skilled in the art from the following description and the accompanying drawings, in which:

Fig. 1 is a vertical, sectional view through a gear box unit embodying the present invention, with certain ancillary parts shown in plan;

Fig. 2 is a transverse, sectional view taken on line 2—2 of Fig. 1;

Fig. 3 is a fragmentary, transverse, sectional view taken on line 3—3 of Fig. 2;

Fig. 4 is a top, plan view of a jig embodying the present invention and carrying the body portion of the gear case for boring of the shaft-receiving recesses; and Fig. 5 is a vertical, sectional view taken on line 5—5 of Fig. 4 and additionally showing the boring tool in position.

The gear box unit of Figs. 1 to 3 comprise a gear case 1, and gears 3 and 4 assembled therein together with their bearings, locking rings, packings and the like.

The gear case 1 consists of a generally cylindrical, hollow body 10 having a closed end 11 integral therewith, an open end and a detachable end cover plate 12 for the open end. The gears 3 and 4 project through end plate 12 and are connected by suitable couplings 13 and 14, respectively, to driving shaft 15 and driven shaft 16. At their inner ends gears 3 and 4 are positioned in recesses 20 and 21, respectively, in end wall 11 by bearings 22. The case may be secured as by cap screws 17 to a support such as thrust channel 18 which may be secured to a suitable support (not shown) and which, as will be noted, is in substantially the same plane as the axis of the lower or propeller shaft gear 4, and at right angles to the axis of that shaft. If and when the case is reversed to bring gear 3 lowermost, the channel 18 should be detached and reattached after such reversal by placing cap screws 17 in the other set of holes provided in the case.

The case is provided with cooling fluid jackets, various portions of which are shown in Figs. 1, 2 and 3. As is indicated in these figures, the case has vertically extending cooling fluid chambers 25 on opposite sides of the gears, these chambers being formed between the outer side walls 23 of the body 10 and inner vertically extending arcuate walls 26. As is indicated in Fig. 3, these walls 26 diverge toward the closed end wall 11, thereby making the chambers 25 generally triangular in horizontal cross section, and project into that end wall and form chambers 27, as noted in Fig. 3. The two chambers 27 are connected together above and below the gears by arc-shaped passages 28 in end wall 11. Each chamber 25 is provided with a fitting 29 through which cooling fluid may flow, these fittings being located in the central, horizontal plane of the gear box when it is in assembled position in a boat as indicated in Figs. 1 and 2. Cooling fluid, for example water, may flow in through one fitting and out through the other, and the direction of flow may be reversed if desired by reversing the connections. When so assembled, water entering through one fitting 29 will flow through chambers 25 and 27 then through passage 28 below the gears and into the opposite chambers 27 and 25 and out through the other fitting. Since the oil within the case around the gears will be in contact with the lower portions of walls 26 and end wall 11, the water following the path just outlined will be in contact with the walls which are in contact with the bulk of the oil and, hence, the cooling of the oil will be quite efficient. Since little cooling of the oil could be accomplished by cooling the walls in the top of the case, i. e., above upper gear 3, it is unnecessary to fill the upper portions of chamber 25 with water and thus the case can be lightened to the extent of the metal displaced by the chambers 25 and 27 and passage 28 and the absence of water therefrom. Since chambers 25 are connected near their upper and lower ends by passages 28, the same cooling action will take place regardless of which ends of the chambers 25 are uppermost.

Clean-out plugs 31 are provided in passages 28 and drain-out plugs 32 are provided on opposite sides of the case 1 near its open end, two of these plugs being provided so that the water may be drained out whether the box is in upright or reversed position.

It will be noted (Figs. 1 and 2) that the gears 3 and 4 have their longitudinal centerlines in the same plane and that the case 10 and cover plate 12 are parted on a plane perpendicular to the plane of the gear axis (see Figs. 1 and 3), thus requiring a single, simple ring gasket to seal the oil chamber. The case 1 may be set up for machining so that the open end surface 35 of the case may be machined economically and accurately. The end plate 12 may be similarly machined to form surface 26 which is to bear against surface 35. When the case and cover are secured to each other in the predetermined position, they may be bored to form the seats for the bearing races of the gears.

The method of and apparatus used for boring these parts will presently be described.

As is shown in Fig. 1, the gears 3 and 4 are bevel gears and the axes of their shafts converge toward the closed end 11 of the case. These ends of the shafts are mounted in bearings 22 above mentioned which are seated in bores 20 and 21 of end wall 11. Preferably these bores extend entirely through the end wall 11 and are closed in any suitable manner as by Welsh plugs 40, but if desired, they need not extend entirely through the end wall, as will be understood by those skilled in the art. The gear shafts at the other side of the gears are mounted in bearings 45 and 46 which are seated in bored openings in cover plate 12, shoulders 47 at the inner end of each such bore serving as abutments which limit the extent of permissible inward movement of the bearings relative to cover plate 12. Conventional positioning rings 48 may be screwed into each of the bores to bear against the outer race of the bearings 45 and 46 and position them axially relative to the gear shafts. Conventional dust excluding and lubrication-retaining packings, as shown at 49, may surround the shaft in the outer ends of the bores in plate 12. Plate 12 may be secured to case 10 by any suitable means, for example, by screws 50 (Fig. 3) and a gasket 51 is preferably located between the case 10 and plate 12 to prevent escape of oil from the chamber in which the gears are housed.

Figs. 4 and 5 show apparatus for use in carrying out the present new machining method and producing the new gear case unit. The apparatus shown in these figures is a jig which may be attached to any one of various types of machines such as a lathe, boring machine or milling machine. This jig comprises a base plate 60 which is generally rectangular in plane and which may be attached to the lathe, boring or milling machine. A pivot pin 61 projects upwardly from base 60 near one end thereof and a stop pin 62 projects upwardly from the face near the other end thereof. These two pins are preferably located midway between the side edges of the base 60 and are perpendicular to the top surface of that base. A slide plate 63 is affixed to the top of base 60 and is of the same thickness as the collar 64 on pivot pin 61. A case-carrying table or carriage rests on slide plate 63 and shoulder 64. This table comprises a flat plate 65, side plates 66 extending upwardly from the opposite edges thereof and at right angles thereto, a face plate 67 connected to plates 65 and 66 at the forward or free ends of the latter, and a hollow, cylindrical bearing 68 disposed at right angles to plate 65, attached to the opposite or converging ends of sides 66 and sized to fit pivot pin 61 closely for pivoting movement relative thereto. At its opposite or free end, plate 65 has two parallel projecting fingers 69 which have opposed, parallel, vertical surfaces 70 disposed on opposite sides of stop pin 62. A cap screw 71, extending through one or another of holes 72 in plate 65, projects into a threaded hole in slide 63 and serves to retain the carriage in a predetermined position during boring of a case carried by said table.

Figs. 4 and 5 show a gear case, consisting of the integral side and end parts 10 and 11 and detachable cover plate 12 mounted on the table for boring with the table adjusted on base 60 for boring the recesses for receiving one of the gears of the gear case.

As shown in Fig. 4, the table has been swung about pin 61 until surface 70 of one finger 69 has engaged pin 62 and cap screw 71 has been passed through one hole 72 and screwed into plate 63. In this position a gear case and cover assembly attached to face plate 67 of the table will be positioned to be bored on a line connecting the centers of pins 61 and 62.

This boring is to be accomplished by the boring bar 75 which is positioned with its centerline parallel to the line joining the centers of the pivot pin 61 and stop pin 62. When this bar 75 is advanced, tool 76 serves to bore aligned holes through plates 12 and 11 to receive the shaft of one gear. Cutting tools 76, 77 and 78 are spaced apart in the boring bar 75 the proper distance for each to be in operation for part of the time, i. e., when tool 76 is making bore 21, tool 77 may be enlarging the bore which was formed in plate 12 by tools 76 as it advanced into the box and which is to receive bearings 46, and tool 78 may be counterboring the bearing hole for locking ring 48 and packing 49.

After the bores for one gear have been made in the box, for example, the lower pair of holes in Fig. 4, screw 71 may be removed, the table turned about pin 61 a predetermined distance, for example until the opposed surface 70 engages the other side of pin 62 and then screw 71 may be reassembled with the carriage to lock the carriage in that adjusted position. When the boring bar 75 is again advanced, it will bore another pair of corresponding holes in the manner just described.

Since the boring bar is parallel with the line joining pins 61 and 62 and the case is pivoted about the center of pin 61, it follows that the axes of each pair of bores will lie in the same plane and will intersect at the centerline of pin 61. When the angular distance between these two centerlines, which are indicated at 80 and 81 in Fig. 4, is the same as that used in cutting the gears and the gears are assembled with their centerlines coinciding with these lines 80 and 81, the centerlines of the gears will lie in the same plane and will also intersect at the centerline of pin 61. When the case is mounted on plate 67 with predetermined points thereof, such as shoulders 47, located a predetermined distance from pin 61 and that distance is the same as the "cone" distance of the gears, the gears will bear on each other in exactly the way they were intended to bear when they were being cut. For example, when the gears are being machined, an accurate measurement can be made from the inner end of bearing 45 or 46 to the point of intersection of the axes of the gears. When that same distance is maintained between the centerline of pin 61 and the outer side of shoulder 47 against which the bearings 45 or 46 are to bear, the gears may be so assembled and will have the predetermined bearing on each other without requiring any adjustment by shims or otherwise.

Hence, by knowing the angularity and "cone" dimension present when the gears were cut and by machining the case so that when the gears are assembled therein they will have exactly the same angularity and "cone" distance, accurate, predetermined positioning of the gears in the case may be had without resort to the previous "cut and try" methods or the use of shims for shifting the gears axially.

It will be understood that the size of the angle between the pairs of bores in the case may be varied by varying the diameters of pins 62. Where the distance between the surfaces 70 of these two fingers has been predetermined for the desired angularity, it is necessary only to shift the carriage from engagement of one finger with a stop pin to engagement of the other finger with the opposite side of the stop pin and the locking of the parts in that adjusted position, as by screw 71. If different angles are desired, they may be obtained by selecting pins 62 which have the correct diameters to give the desired angles. A smaller diameter pin will result in a larger included angle while a larger diameter pin will give a smaller included angle.

The jig just described and the machining method which may be carried out with it afford a much higher degree of accuracy in boring the case than has been obtained by any other method and apparatus with which I am familiar. In fact, the degree of accuracy is so great that gears may be installed in the gear case in the position predetermined during the machining and will run satisfactorily without being adjusted otherwise and without objectionable wear or noise.

From the foregoing specification, it will be understood by those skilled in the art that I have provided a new, highly advantageous method of, and also apparatus for, machining a gear case for V-drive; that I have also provided a new gear box unit for V-drive wherein the gears may be assembled initially in predetermined position without adjustment and the use of "cut and try" shims; that the gear box unit may be turned through 180° to reverse the ratio of the speeds of the driving and driven shafts; and that I have provided a new and efficient means of cooling the gear oil within the case.

Having thus described the present invention so that others skilled in the art may be able to understand and practice the same, I state that what I desire to secure by Letters Patent is defined in what is claimed.

What is claimed is:

1. A case for a gear unit, including bevel gears and gear shafts, comprising a body having a generally cylindrical side wall, arcuate walls within the case and integral with and spaced from opposite parts of said side wall and partially defining upwardly extending sector-shaped cooling fluid chambers, the side wall having fluid inlet and outlet openings extending therethrough into each of said chambers aproximately midway between their ends.

2. A case for a gear unit, including bevel gears and gear shafts, comprising a body having a generally cylindrical side wall, an end wall integral therewith and a removable end wall, said end walls having apertures to receive gear shafts disposed with their axes in a vertical plane, arcuate walls within and integral with the case and spaced from the side wall thereof and partially defining having sector-shaped cooling fluid chambers extending upwardly past each side of said gears, the side wall having fluid inlet and outlet openings extending therethrough into each of said chambers approximately midway between their upper and lower ends.

3. A case for a gear unit, including bevel gears and gear shafts, comprising a body having a generally cylindrical side wall, an end wall integral therewith and a removable end wall, said end walls having apertures to receive gear shafts disposed with their axes in a vertical plane, arcuate walls within and integral with the said side wall and spaced from the latter and partially defining sector-shaped cooling fluid chambers extending upwardly past each side of said gears, the side wall having fluid inlet and outlet openings extending therethrough into each of said chambers approximately midway between their upper and lower ends, the integral end wall having circumferentially extending passages connecting said chambers above and below the gear shaft apertures therein.

4. A gear unit comprising a two-part case, each part having two apertures arranged in pairs to receive two shafts extending through one of the parts, bearings in the apertures, shafts in the bearings, and bevel gears fixed on the shafts between the bearings, each shaft being coaxial with its bearings, its apertures, and its gear and the axes of the two shafts intersecting at a point outside of the case, and means to position the gears with the apices of their cone angles substantially coinciding with the intersection of the shaft axes, said means including shoulder means in the apertures of one part of the case and on the shafts adjacent to said apertures, means on each shaft to press one end of the bearing thereon against the shoulder means on the shaft and means adjustable axially in each shouldered aperture to engage the bearing therein and to position the bearing engaging surfaces of the shoulder means on the shaft and in the aperture in predetermined position relative to each other.

5. The combination of elements set out in claim 4 in which the gears are integral with the shafts.

6. The combination of elements set out in claim 4 in which the shoulder means in the apertures and on the shafts face outwardly of the case.

7. The combination of elements of claim 4 in which one part of the case is a cover plate and contains the apertures having shoulder means therein.

8. The combination of elements set out in claim 4 in which the axially adjustable means are screw-threaded in their apertures.

9. The combination of elements set out in claim 4 in which one part of the case is a cover plate in which is located the apertures having shoulder means, the shoulder means on the shafts, the bearings engageable with both of said shoulder means and the means for positioning the bearing engaging surfaces of said shoulder means.

10. The combination of elements set forth in claim 4 in which a bracket for attaching the case to a mounting is connected to the case and is disposed at substantially right angles to the plane of the center line of the gears and in line with the axis of one of said shafts.

References Cited in the file of this patent

UNITED STATES PATENTS

| | | |
|---|---|---|
| 616,559 | Rasmussen | Dec. 27, 1898 |
| 833,769 | Brasier | Oct. 23, 1906 |
| 1,329,827 | Critall | Feb. 3, 1920 |
| 1,548,917 | Vincent | Aug. 11, 1925 |
| 1,605,376 | Schmitt | Nov. 2, 1926 |
| 1,657,510 | Leipert | Jan. 31, 1928 |
| 1,772,158 | Prigg | Aug. 5, 1930 |
| 1,874,905 | Coffey | Aug. 30, 1932 |
| 1,902,934 | Acker | Mar. 28, 1933 |
| 2,130,125 | Fromm | Sept. 13, 1938 |
| 2,283,469 | Shepard | May 19, 1942 |
| 2,404,456 | Pierce | July 23, 1946 |
| 2,471,871 | Grant | May 31, 1949 |
| 2,582,336 | Koza | Jan. 15, 1952 |

FOREIGN PATENTS

| | | |
|---|---|---|
| 92,219 | Sweden | May 4, 1938 |
| 727,085 | Germany | Oct. 27, 1942 |